Patented May 31, 1949

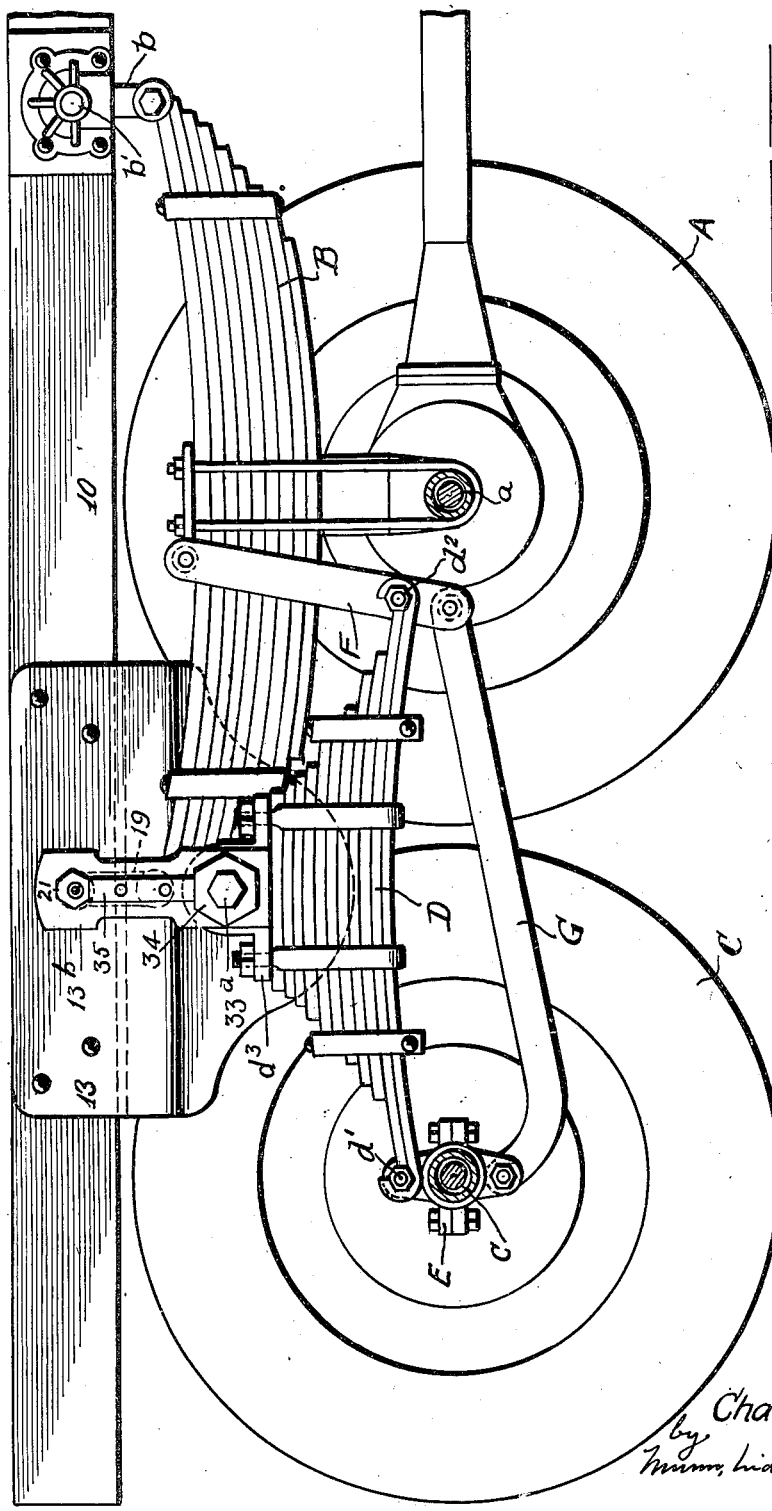

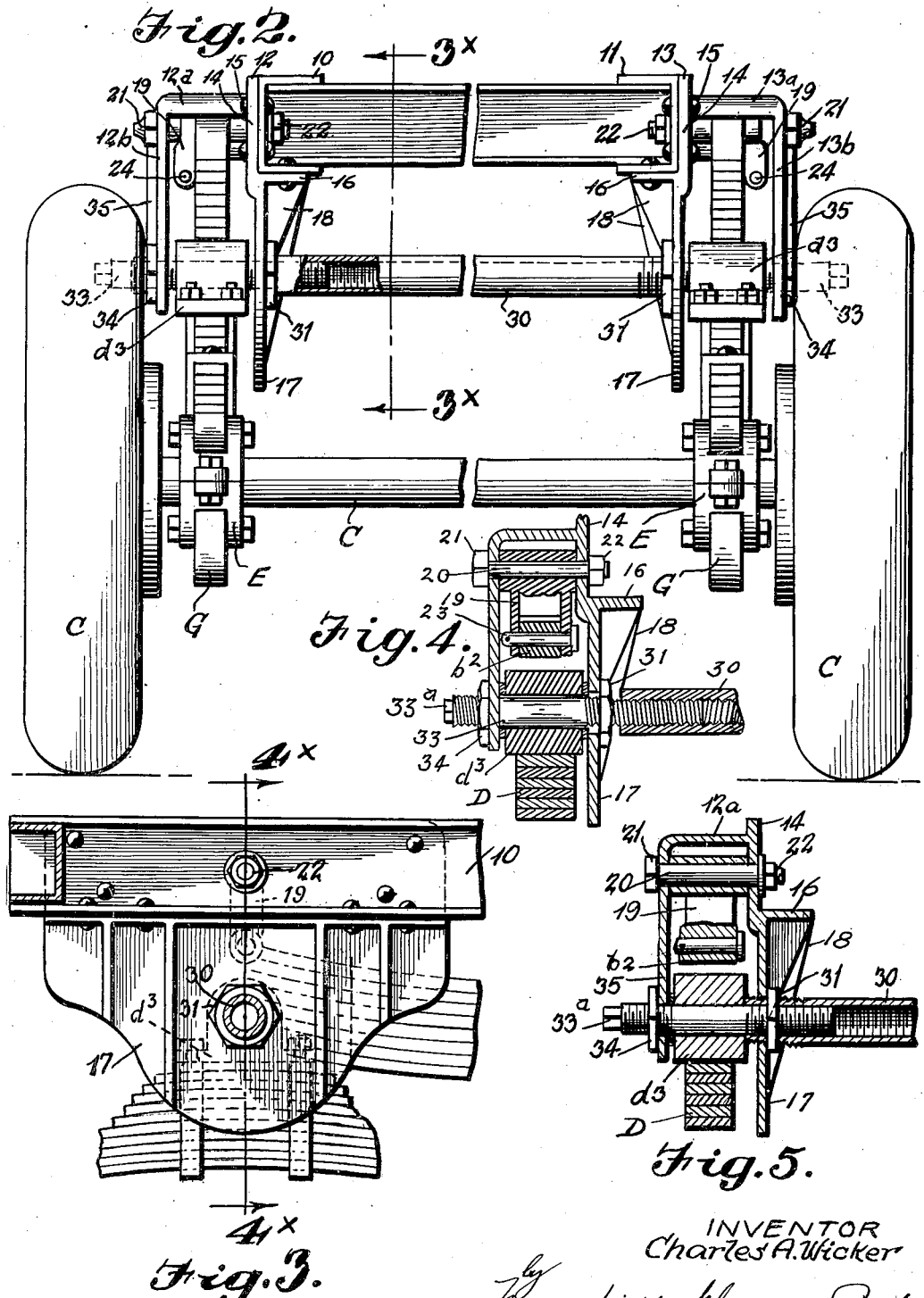

2,471,992

UNITED STATES PATENT OFFICE 2,471,992

MOUNTING FOR TANDEM SPRINGS FOR TRUCKS

Charles A. Wicker, Selma, Ala.

Application August 17, 1945, Serial No. 611,021

4 Claims. (Cl. 267—36)

1

This invention represents an improvement over the Tandem wheel construction shown in my Patent 2,208,484, granted July 16, 1940.

My present invention has for its object to provide a mounting for tandem springs for tandem truck wheels, which in addition to increasing their load carrying capacity will also serve to prevent breakage of their points of attachment.

Another object of the invention is to provide an arrangement of parts which not only lessens the cost of manufacture, but will simplify their application to a vehicle either during its original construction or in servicing vehicles now in use.

A further object of my present invention is the provision of an adjustable cross bracing member for connecting the mountings at the opposite sides of a truck chassis which renders the mountings universally applicable to different makes of trucks and also stiffens the side rails of the truck body at points where the strain on them is the greatest.

To these and other ends my invention comprehends other improvements all as will be described in the following specification, the novel features thereof being pointed out in the appended claims.

In the drawings:

Figure 1 is a side elevation of a tandem spring truck mounting embodying one form of my present invention.

Figure 2 is a rear view thereof.

Figure 3 is a detail view showing the inner side of the bracket looking in the direction of the arrows in the section line $3^x$—$3^x$ of Fig. 2.

Figure 4 is a vertical cross section taken on the line $4^x$—$4^x$ of Fig. 3.

Figure 5 is a view similar to Fig. 4 showing a modified way in which the cross brace may be utilized.

Similar reference numerals in the several figures indicate similar parts.

The tandem wheel form of mounting which I employ is intended primarily for use on automobiles intended for transporting heavy loads. These wheels are located beneath the rear end of the vehicle in alinement at each side thereof, as will be understood. The forward pair A are carried on the power driven axle $a$ and carry the forward set of heavy duty leaf springs B, the upper leaf of which carries an eye and is connected to a shackle $b$ suspended from the point $b'$ at a point ahead of the axle $a$.

The rear wheels C of the set are mounted on an axle $c$ and between the latter and axle $a$ is the rear set of tandem springs D, the leaves of which

2 are in a position reverse to the leaves of springs B. Springs D are supported by the eyes on the lower leaf, the rear one being connected at $d'$ to an upwardly extending projection on a coupling E carried by the axle C. The forward eye of spring D is attached by the pivot point $d^2$ to a strap F suspended from the top of the spring bank B and is capable of rocking relatively thereto for effecting an equalizing movement of the two sets of springs. To this end the lower extremity of the strap is tied by a rocker arm G to a lower projection on the rear axle coupling E, as shown in Fig. 1.

My present invention is directed to the mounting by means of which the rear ends of springs B and the center of springs D are connected to the chassis.

The vehicle frame or chassis comprises the side rails 10 and 11, usually in the form of channels. Attached to these in center alinement with the springs D are brackets 12 and 13 each having a face portion 14 secured to said rails, as by rivets 15, an inwardly extending shoulder 16 engaging beneath the rails, and likewise riveted thereto, and a depending skirt 17 braced by ribs 18.

Extending outwardly from the faces 14 of the mountings are arms $12^a$ and $13^a$ and depending from their extremities are hangers $12^b$ and $13^b$ which extend over the outer sides of the two sets of springs. In the top of the spaces thus provided I pivot shackles 19 on bolts 20 which extend through the arms $12^b$ and $13^b$ and through their respective facings 14. These bolts are rigidly but detachably held in place by nuts 21 and 22 and the lower ends of said shackles carry the journal pins 23 for the eyes $b^2$ of spring B. The pins 23 are held in place by dowels 24.

Directly below the last described connections are those which carry the rear tandem spring D. These comprise the pivot block $d^3$ attached at the center and top of the spring assembly D.

The suspension of the rear end of spring B and the center of spring D at points below the side rails of the chassis makes it desirable to brace the depending ends of the brackets not only for the purpose of strengthening them, but also for the purpose of stiffening that part of the chassis which is subjected to various strains imparted when carrying heavy loads traveling at high rates of speed and particularly to resist those strains imparted in making turns and following highway curves. The described equipment is applicable to trucks of different make which may vary somewhat in width and whether it is applied by the truck manufacturer or is used as a replacement of the rear wheel assembly it is desirable that it be so constructed that it may be readily applied by unskilled labor. To these ends I have simplified the structure by employing the axes of the journal blocks $d^3$ of springs D, as a means of connection between the pair of mountings 12 and 13 in conjunction with a transversely extending brace rod 30 and also utilize the latter as an element for sustaining the inner ends of these journals and holding them in alinement.

The journals, indicated by 33, see Fig. 4, project at their inner ends through apertures in the bracket skirts 17 for a considerable distance and are threaded. At their outer ends they are likewise threaded and these two threads carry nuts 31 and 34, the former setting against the inner faces of the skirts 17 and the latter locking the outer faces of the arms $12^a$, $13^a$. These journals are also provided with nut shaped ends $33^a$.

The brace 30 may be in the form of a rod having end bores or it may be a tube-threaded interiorly at its ends to receive the journal studs 33. It may be of such a length that when the parts are connected its ends fit snugly between the nuts 31 although this is not essential to its operation and one end or the other may be out of contact with the contiguous nut 31, as shown in Fig. 4.

In Fig. 5 I have shown a modification indicating an additional use that may be made of the brace 30. By extending it through the inner faces of the skirts 17 in alinement with the perforations in blocks $d^3$ its ends may abut the inner faces of the blocks $d^3$ to hold them out of contact with the skirts 17. Here the brace is also threaded externally at its ends and the nuts 31 are placed thereon and may be set up against the skirts to maintain them separated in fixed position, as shown in Fig. 5 and also at the right hand end of Fig. 2.

From this construction it will be seen that by turning up the journal pins 33 the brace is held tightly in place and the pins themselves are held against displacement by their lock nuts 31 and 34. As a means of securing the nuts 34 and 21 I employ a plate 35 (Fig. 1), the squared ends of which engage the facets of said nuts.

I claim as my invention:

1. A mounting for the springs for tandem truck wheels which springs are disposed in overlapping tandem arrangement, said mounting comprising a bracket for attachment to a side rail of a truck frame having depending inner and outer arms embracing said springs, a shackle pivoted between the arms near their upper ends and carrying the rear end of the forward spring and a second connection for the center of the rear spring also pivoted between the bracket arms below the shackle.

2. A mounting for tandem wheel springs for trucks, said spring being arranged in tandem, the combination with an automobile truck chassis having side rails, of separate brackets adapted to be attached one to each rail, each having an inner skirt portion extending below its respective rail and an outwardly projecting arm having a depending end spaced from said skirt and forming an outer member, upper and lower journals supported between the inner and outer portions of said mounting, the upper journal carrying the rear end of the forward spring and the lower journal carrying the rear spring at its center.

3. Mountings for the lateral pairs of tandem leaf springs, of an automobile comprising the combination of the side rails of a vehicle chassis, a bracket attached to each of said rails having depending spaced arms, shackles pivoted between the upper ends of the bracket arms carrying the rear ends of the respective forward springs, journal boxes on each of the rear springs of said pairs of springs located between the arms of the respective brackets, a brace extending between the brackets in alinement with the journal portions of said boxes and journal pins in threaded engagement with the brace extending through the boxes and carried by the arms of said brackets.

4. The combination with the side rails of an automobile chassis and the pairs of tandem leaf springs located adjacent said rails, of mountings for said springs comprising brackets attached one to each of said rails, each bracket having depending spaced arms, a shackle pivoted between the arms of each mounting carrying the rear end of the forward spring of a respective pair of springs, a threaded journal pin carried in the lower ends of the arms of each bracket, boxes carried by each of said pins and attached one to each of the rear springs of said pairs of springs, nuts on the pins engaging the contiguous faces of the respective bracket arms and a brace extending between the inner sides of the brackets and united to the inner ends of said journal pins.

CHARLES A. WICKER.

REFERENCES CITED

The following references are of record in the file of this patent:

UNITED STATES PATENTS

| Number | Name | Date |
| --- | --- | --- |
| 1,643,970 | Wilkins | Oct. 4, 1927 |
| 2,028,127 | Hutchens et al. | Jan. 14, 1936 |
| 2,208,484 | Wicker | July 16, 1940 |
| 2,211,647 | Collier | Aug. 13, 1940 |
| 2,250,019 | Heinmiller | July 22, 1941 |
| 2,387,874 | Bradley | Oct. 30, 1945 |